(12) United States Patent
Hinterberger et al.

(10) Patent No.: US 11,075,412 B2
(45) Date of Patent: Jul. 27, 2021

(54) DYNAMICALLY DISCONNECTABLE BATTERY SYSTEM FOR A MOTOR VEHICLE AND METHOD FOR OPERATING A DYNAMICALLY DISCONNECTABLE BATTERY SYSTEM

(71) Applicant: AUDI AG, Ingolstadt (DE)

(72) Inventors: Michael Hinterberger, Großmehring (DE); Berthold Hellenthal, Schwanstetten (DE)

(73) Assignee: AUDI AG, Ingolstadt (DE)

( * ) Notice: Subject to any disclaimer, the term of this patent is extended or adjusted under 35 U.S.C. 154(b) by 78 days.

(21) Appl. No.: 16/353,284

(22) Filed: Mar. 14, 2019

(65) Prior Publication Data
US 2019/0288345 A1    Sep. 19, 2019

(30) Foreign Application Priority Data
Mar. 15, 2018  (DE) .......................... 102018204000.1

(51) Int. Cl.
| | |
|---|---|
| *H01M 10/42* | (2006.01) |
| *H01M 2/10* | (2006.01) |
| *H01M 2/34* | (2006.01) |
| *B60R 16/033* | (2006.01) |
| *H01M 50/20* | (2021.01) |
| *H01M 50/572* | (2021.01) |

(52) U.S. Cl.
CPC ......... *H01M 10/425* (2013.01); *B60R 16/033* (2013.01); *H01M 50/20* (2021.01); *H01M 50/572* (2021.01); *H01M 2010/4271* (2013.01); *H01M 2220/20* (2013.01)

(58) Field of Classification Search
None
See application file for complete search history.

(56) References Cited

U.S. PATENT DOCUMENTS

2014/0335384 A1*  11/2014  Kohlberger ............ H01M 2/32
                                                          429/50
2015/0303442 A1*  10/2015  Elian .................... H01M 2/345
                                                          320/136

FOREIGN PATENT DOCUMENTS

| DE | 102007017018 A1 | 3/2008 |
|---|---|---|
| DE | 102010041024 A1 | 3/2012 |
| DE | 102014218850 A1 | 3/2016 |

\* cited by examiner

*Primary Examiner* — Osei K Amponsah
(74) *Attorney, Agent, or Firm* — Maier & Maier, PLLC

(57) ABSTRACT

A dynamically disconnectable battery system for a motor vehicle, including a plurality of battery cells, having a respective battery cell housing with electrical connections by which the battery cells are electrically interconnected. In the battery cell housings there is arranged a respective cell branch connecting the connections to a galvanic cell. Each cell branch includes a switching element for opening and closing the cell branch; the battery system includes a control device, which is configured to actuate all the switching elements of the cell branches for the opening of the switching elements when the control device has received a danger signal from at least one sensor.

9 Claims, 2 Drawing Sheets

DYNAMICALLY DISCONNECTABLE BATTERY SYSTEM FOR A MOTOR VEHICLE AND METHOD FOR OPERATING A DYNAMICALLY DISCONNECTABLE BATTERY SYSTEM

FIELD

The invention relates to a dynamically disconnectable battery system for a motor vehicle. Furthermore, the invention further relates to a motor vehicle with such a battery system and a method for operating a dynamically disconnectable battery system.

BACKGROUND

Especially on account of the increasing electrification of motor vehicles, the use of batteries, for the most part high-voltage batteries, is becoming increasingly common in electrically driven motor vehicles. Such battery systems or batteries comprise for example a plurality of lithium ion cells interconnected with each other. Especially in event of a crash, a certain danger potential may be presented by such battery cells, for example, short circuits caused by deformation, intense heat production, and the like. Diverse mechanisms are already known in the prior art for minimizing the risk resulting from batteries, especially in event of a crash or during other critical situations.

DE 10 2007 017 018 A1 reveals a bypassing of defective cells in batteries. For the bypassing of individual cells in event of an excess pressure building up in the cell, a cell bypass device is proposed, being provided on the outside of the cells and comprising movable switchable electrical contact elements, which can be switched from a first to a second switching state.

DE 10 2010 041 024 A1 describes a method in which battery modules considered to be critical can be deactivated and bypassed.

DE 10 2014 218 850 A1 describes a method for controlling a battery assembly of a motor vehicle, wherein in event of a defect in one battery cell the defective battery cell can be disconnected and bypassed by means of a switching device arranged outside the battery cell.

SUMMARY

The problem which the present invention proposes to solve is to provide a solution by means of which the safety and availability of battery systems with a plurality of battery cells can be improved in an especially effective manner.

This problem is solved by a dynamically disconnectable battery system for a motor vehicle and by a method for operating a dynamically disconnectable battery system with the features of the independent patent claims. Advantageous embodiments with expedient and nontrivial modifications of the invention are indicated in the dependent claims.

The dynamically disconnectable battery system for a motor vehicle comprises a plurality of battery cells, having a respective battery cell housing with electrical connections by which the battery cells are electrically interconnected, wherein in the battery cell housings there is arranged a respective cell branch connecting the connections to a galvanic cell. Each cell branch comprises a switching element for opening and closing the cell branch. Furthermore, the battery system comprises a control device, which is configured to actuate all the switching elements of the cell branches for the opening of the switching elements when the control device has received a danger signal from at least one sensor.

The battery system in the sense of the invention thus comprises an interconnection of a plurality of similar galvanic cells or elements. These may basically include both primary cells and secondary cells. The cells may also be, for example, so-called solid state cells and also traditional galvanic cells, such as lithium ion cells of the like. Likewise, the cells may also be fuel cells, for example.

Said switching elements may be electronic switching elements, i.e., field effect transistors or also diodes. But the switching elements may also be electromechanical switches, such as relays. What is essential to the switching elements is that they are able to switch the respective cell branches with the galvanic cells, i.e., switch the respective cell branches either electrically conducting or electrically disconnected, and be compact enough to be accommodated inside the battery cell housing.

By means of the battery system according to the invention it is possible to disconnect, on the cell level, all galvanic cells when necessary from the circuit of the battery system, i.e., also from each other. For example, if a portion of the battery system is deformed on account of a crash of the motor vehicle in which the battery system is installed, it is possible at first to interrupt all cell branches with the galvanic cells, for safety reasons, by the control device appropriately actuating the respective switching elements. For this, the control device may be designed for example to receive the danger signal from a crash sensor of the motor vehicle. Crash sensors, also called impact sensors, are usually employed in motor vehicles to detect an impact of the vehicle against an obstacle. If the sensor has detected an impact, it sends an electric pulse to various controllers, which may also include the control device of the battery system. The crash sensor can be for example an acceleration sensor, a pressure sensor or also a sensor which can recognize a crash from changes in structure-borne sound of the bodywork sheet metal which is deformed by the impact. Likewise, it is also possible for the control device to be designed to receive the danger signal from an airbag controller of the motor vehicle, for example. When the control device has received the at least one danger signal from the at least one sensor of the motor vehicle, it will actuate the individual switching elements of the respective battery cells, so that the switching elements are opened. In the case of a collision of the motor vehicle, it may be assured in this way within the shortest time that all battery cells have been electrically disconnected from each other. It may also be prevented in this way that intact battery cells dump their energy into a short circuit, for example, resulting in very heavy current flowing. With the aid of the dynamically disconnectable battery system according to the invention, it is possible to interrupt all circuits at the battery cell level, when necessary. Regardless of whether some of the battery cells are involved in the crash, and others not, it is then possible to reliably prevent currents from flowing within the battery system. With the aid of the battery system according to the invention, all battery cells can be electrically disconnected from each other. In this way, an especially safe battery system is provided.

According to one advantageous embodiment of the invention it is proposed that the battery cells have at least one sensor for generating the danger signal, wherein the control device has decentralized control units integrated in the battery cells, especially microcontrollers integrated in the battery cells, for each battery cell, which are configured to actuate the switching elements for the opening of the switching elements. The decentralized control units are thus connected by signal technology to the respective sensors. Said sensors may be, for example, shock sensors, gyrometers and/or acceleration sensors. Each battery cell is thus able to recognize danger situations, such as a crash or an unstable vehicle condition in the form of a skidding and/or a rollover of the motor vehicle. Furthermore, the battery cells can themselves decide whether to activate the switching elements independently. In this way, the comparatively time-consuming signals from sensors on the vehicle do not have to arrive first at the battery cells, e.g., via a BUS system. Instead, critical danger situations of the motor vehicle can be recognized independently at the cell level and the response can be an independent opening of the switching elements. Thus, valuable time can be saved, especially in event of very severe crashes.

One advantageous embodiment of the invention proposes that the control device has a central control unit which can be connected by signal technology to the at least one sensor, wherein the control device has respective decentralized control units, especially microcontrollers integrated in the battery cells, for each battery cell, which are configured to actuate the switching elements for the opening of the switching elements. The central control unit thus can receive for example the danger signal from a crash sensor or also from an airbag sensor of the motor vehicle.

Consequently, the central control unit sends corresponding control commands to the decentralized control units, which then in turn assure that the respective switching elements of the cell branches are opened. Signals from the crash sensor or also from the airbag sensor can be polled by the central control unit in familiar fashion via a BUS system of the motor vehicle, but also in a different way. The communication between the central control unit and the decentralized control units may be wireless, for example, while a wire-line data transmission or signal transmission is also possible. Thanks to the decentralized control units, an especially fault-secure system is provided, since each battery cell is given its own control unit, for example in the form of a microcontroller. Furthermore, it is also basically conceivable for the central control unit to be omitted, in which case the control device then comprises only the decentralized control units, which can be coupled by information or signal technology to a crash sensor, for example, or also to an airbag controller of the motor vehicle.

In another advantageous embodiment of the invention it is proposed that the battery system comprises at least one contactor for disconnecting a plus pole from a minus pole of the battery system, wherein the control device is designed to actuate the contactor for opening the contactor if the control device has received the danger signal. The contactor thus serves as a load disconnector, which is opened as soon as the control device has received the at least one danger signal from the at least one sensor. Preferably, the battery system has a respective contactor both near the plus pole and near the minus pole. In this way, it can be assured at both poles of the battery system that no more current flows across the poles in the danger situation.

Another advantageous embodiment of the invention proposes that the control device is designed to actuate the switching elements of the cell branches for opening the switching elements only if the contactor has been opened. The invention is based on the knowledge that contactors usually have a more sluggish reaction or opening behavior than the switching elements which can be used in the cell branches, which are preferably electronic switching elements. The at least one contactor might be opened for example in the millisecond range. Once this has occurred, the switching elements are opened free of load within microseconds to nanoseconds—leaving out corresponding internal short circuits within the battery system. For example, if the battery system has not been entirely affected by a crash so that all battery cells can no longer be used, it can be ensured in this way that the switching elements are not needlessly involved in the opening process, since these can be switched substantially load-free as long as the at least one contactor was previously opened.

In another advantageous embodiment of the invention it is proposed that there is arranged in the battery cell housings a respective bypass branch for bypassing the respective galvanic cell and each bypass branch has a bypass switching element for opening and closing the bypass branch, wherein the control device is designed to actuate the switching elements and the bypass switching elements to open if the control device has received the danger signal. In this way, it can be ensured that no current can flow either across the bypass branch or across the respective cell branch, namely, once the respective switching elements or bypass switching elements have been opened.

Another advantageous embodiment of the invention proposes that the control device is designed to actuate the switching elements to close the switching elements after the opening of the switching elements and bypass switching elements if the battery cells are functioning fault-free and the bypass switching elements are still opened. The dynamically disconnectable battery system is thus preferably able to recognize which of the battery cells are functioning fault-free and which have been affected so much that they are no longer functioning fault-free. The former can be reactivated after a crash, for example, by leaving the previously opened bypass switching elements to remain open, while the switching elements of the cell branches are closed. Thus, it is possible in the dynamically disconnectable battery system to decide at the battery cell level, after an accident, which of the battery cells can continue to be used with no problem for the power supply. For example, it is conceivable that only some of the battery cells in a front region of the battery system are affected on account of a frontal impact, whereas battery cells in a middle and rear region have remained intact. The latter may then—so long as it is unobjectionable for safety reasons—be used for the power supply of the particular motor vehicle. In this way, continued operation is possible even after a crash.

According to another advantageous embodiment of the invention it is proposed that the control device is designed to actuate the bypass switching elements to close the bypass switching elements after the opening of the switching elements and bypass switching elements if the battery cells are not functioning fault-free and the switching elements are still opened. In this way, the battery cells not functioning fault-free can be easily bypassed at the cell level. For example, if the battery cells are hooked up partly in series, the bypass branches can be closed for the battery cells not functioning fault-free, so that the particular series circuit of the battery cells can still carry current, but without any current flowing in the battery cells not functioning fault-free. In the case of a parallel circuit of partly defective and nondefective battery cells, on the other hand, it is not absolutely necessary to close these bypass branches. Because of the fact that the battery cells have these bypass branches with the bypass switching elements, a maximum design freedom results in terms of the interconnecting of the battery cells, whereby even after a crash—depending on which of the battery cells have been affected or not—they can still continue to be used with no problem in the overall makeup of the battery system or be bypassed.

In another advantageous embodiment of the invention it is proposed that the battery cells each comprise at least one sensor which is designed to detect whether the battery cells are fault-free and to transmit this data to the control device. For example, several sensors may also be integrated in battery cells, which are designed to measure temperatures, stresses, currents, internal cell pressures, and the like, and to transmit this data to the control device. The battery cells themselves can thus be individually checked and monitored at the cell level. After an accident of the motor vehicle, it is thus possible to perform a respective diagnostics at the cell level in order to determine which of the battery cells are still functioning fault-free and which are not.

The motor vehicle according to the invention comprises the dynamically disconnectable battery system according to the invention or an advantageous embodiment of the dynamically disconnectable battery system.

In the method according to the invention for operating the dynamically disconnectable battery system or an advantageous embodiment of the dynamically disconnectable battery system, the control device of the battery system actuates all the switching elements of the cell branches for the opening of the switching elements when the control device has received a danger signal from at least one sensor. Advantageous embodiments of the battery system according to the invention should be regarded as advantageous embodiments of the method according to the invention, whereby the battery system in particular comprises means of implementing the steps of the method.

BRIEF DESCRIPTION OF DRAWINGS

Further benefits, features and details of the invention will emerge from the following description of preferred exemplary embodiments and with the aid of the drawing. The features and combinations of features mentioned above in the description as well as the features and combinations of features mentioned hereafter in the description of the figures and/or shown solely in the figures may be used not only in the particular indicated combination, but also in other combinations or standing alone, without leaving the scope of the invention.

The drawing shows.

DETAILED DESCRIPTION

In the figures, the same or functionally identical elements are given the same reference numbers.

Figure 1:
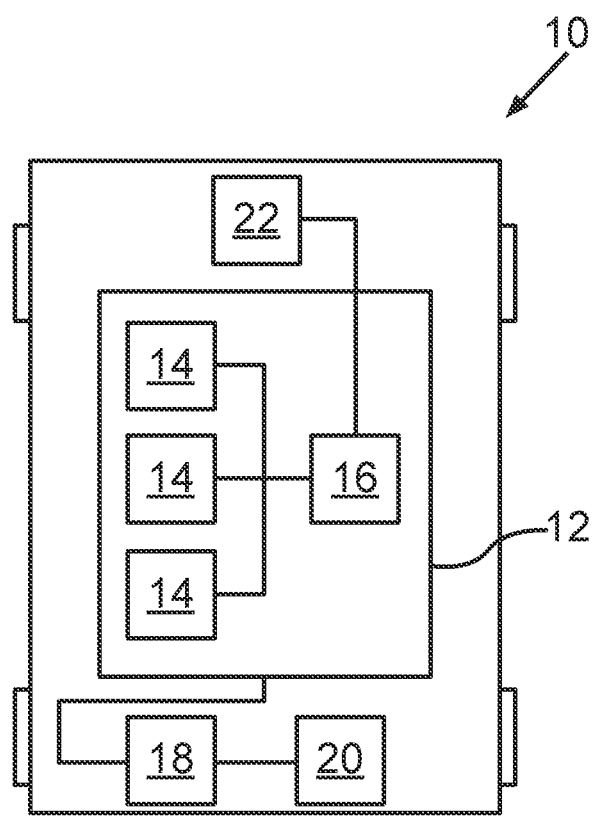
FIG. 1 a schematic representation of a motor vehicle with a dynamically disconnectable battery system, which serves for supplying energy to an electric machine for the driving of the motor vehicle.

A motor vehicle 10 is shown in highly schematized representation in FIG. 1. The motor vehicle 10 comprises a dynamically disconnectable battery system 12. The battery system 12 comprises a plurality of battery cells 14, which are electrically interconnected with each other. Furthermore, the battery system 12 comprises a control device 16 for actuating the respective battery cells 14. The battery cells 14 may be lithium ion cells, for example, but other cell technologies are also possible.

The interconnection of the battery cells 14 produces overall a high-voltage battery for the motor vehicle 10. The battery system 12 may supply a power electronics 18 with electrical energy, which in turn serves for actuating an electric machine 20 for the driving of the motor vehicle 10. The control device 16 of the battery system 12 is furthermore coupled to at least one sensor 22 of the motor vehicle 10. The sensor 22 may be, for example, a crash sensor or also for example an airbag sensor. Furthermore, it is also possible for the control device 16 to be coupled to several such sensors 22. In the battery cells 14 themselves, respective sensors not shown here can also be integrated in the form of shock sensors, gyrometers, and/or acceleration sensors.

Figure 2:
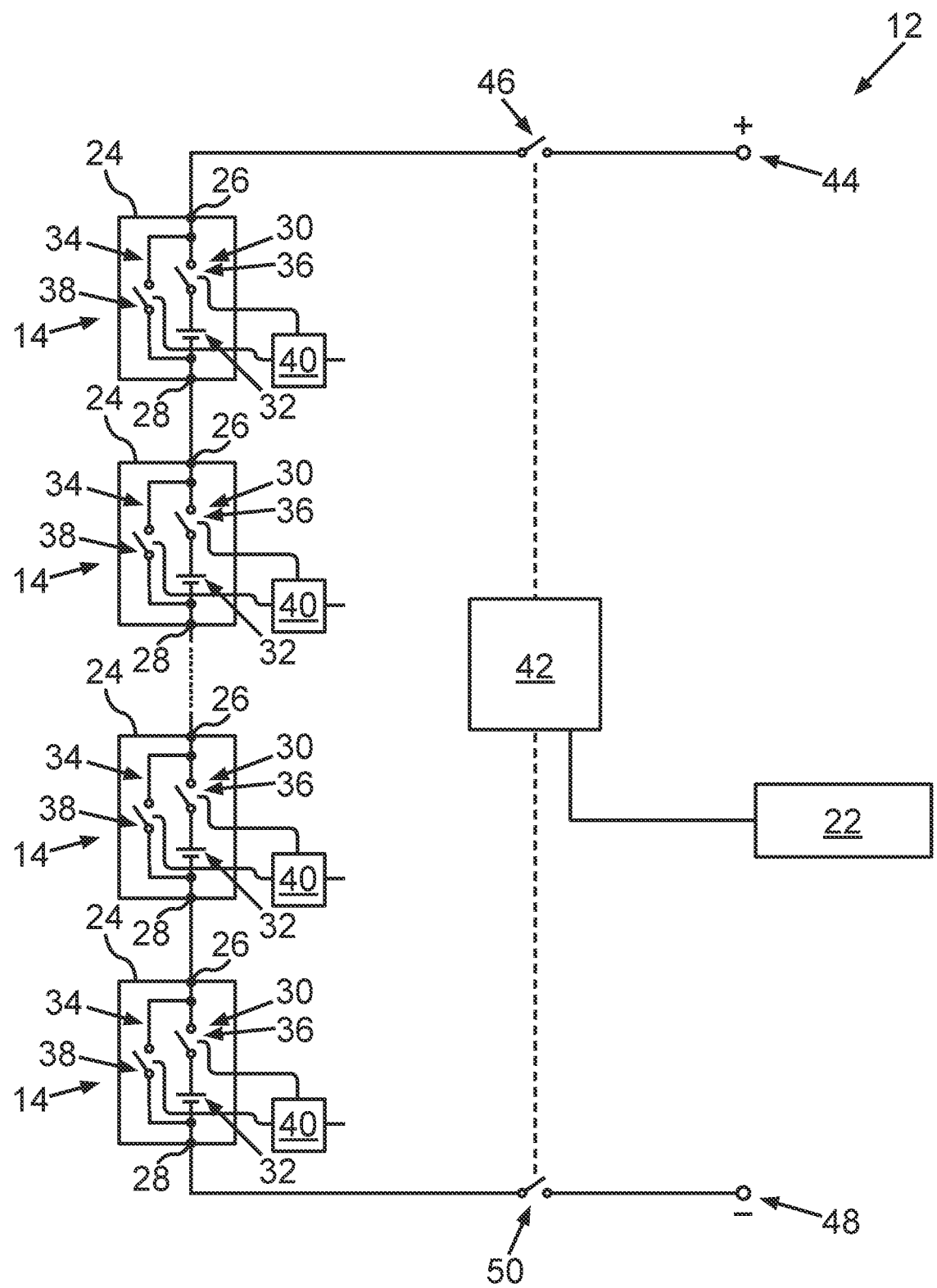
FIG. 2 a schematic representation of the battery system, having respective switching elements and bypass switching elements at the battery cell level.

FIG. 2 shows the battery system 12 in a schematized detail view. Once again, several of the battery cells 14 are shown, the battery cells 14 having respective battery cell housings 24 with respective electrical connections 26, 28, by which the battery cells 14 are electrically interconnected to each other. In the battery cell housings 24 there is arranged a respective cell branch 30 connecting the connections 26, 28 to a galvanic cell 32.

In the battery cell housings 24 there is furthermore arranged a respective bypass branch 34 for the bypassing of the respective galvanic cell 32. Each cell branch 30 further comprises a switching element 36 for the opening and closing of the cell branch 30, each bypass branch 34 having a bypass switching element 38 for the opening and closing of the respective bypass branch 34.

Each battery cell 14 includes a microcontroller 40, which can actuate the respective switching element 36 and the respective bypass switching element 38 for opening and closing. The microcontrollers 40 in turn are connected to a central control unit 42 by data or signal technology. This connection for example may be wireless, or the connection can just as easily be wire-line. The central control unit 42 and the respective microcontrollers 40 together form the control device 16 of the battery system 12 indicated schematically in FIG. 1. The central control unit 42 is connected to the sensor 22 of the motor vehicle 10.

Furthermore, the battery system 12 comprises one contactor 46 in the vicinity of a plus pole 44 and another contactor 50 in the vicinity of a minus pole 48 of the overall battery system 12.

If the motor vehicle 10 collides for example with another vehicle or also with a stationary object, the at least one sensor 22 can detect this and transmit a corresponding danger signal to the central control unit 42. Consequently, the central control unit 42 relays corresponding signals to the respective microcontroller 40, which consequently actuates the switching elements 36 and bypass switching elements 38 in such a way that they are opened. The central control unit 42 furthermore actuates the contactors 46, 50, and consequently these are opened. It may also be provided for the respective microcontrollers 40 to actuate the switching elements 36 and bypass switching elements 38 within the respective battery cells 14 to open only if the contactors 46, 50 have been opened. The contactors 46, 50 have a more sluggish reaction behavior than the switching elements 36, 38 arranged in the battery cells 14, which are preferably electronic switching elements, such as field effect transistors or also diodes. If the switching elements 36 and bypass switching elements 38 provided in the battery cells 14 are opened only if the contactors 46, 50 have been opened, it can be assured that the internal cell switching elements 36, 38 are switched load-free—apart from any short circuits between the battery cells 14.

In the event of a crash during which for example a portion of the battery system 12 is deformed, it can thus be assured that all galvanic cells 32 of the respective battery cells 14 are electrically disconnected from each other. Even if a theoretical short circuit would potentially exist due to heavy deformations of the individual cell housing 24, no more current will flow inside the battery cells 14 or also between the battery cells 14.

Inside the battery cells 14, several sensors not represented here can be arranged, being designed to detect the most diverse operating parameters and measured quantities. These sensors may detect, for example, temperatures, currents, stresses, internal cell pressures, and the like. After a crash of the motor vehicle 10, the respective sensors may transmit data regarding the registered measurement values for example to the central control unit 42 and/or to the microcontrollers 40.

Based on this, the central control unit 42 for example can ascertain which of the battery cells 14 are still functioning fault-free and which are not. For example, if only the battery cells 14 located in the front area of the battery system 12 have been affected by a frontal crash of the motor vehicle 10, while the remaining battery cells 14 remain intact, the intact and still perfectly functional battery cells 14 can continue to be used for the energy supply and thus for the driving of the motor vehicle 10.

Furthermore, the sensors already mentioned in the form of shock sensors, gyrometers, and/or acceleration sensors may also be integrated inside the battery cells 14. In this case, the battery cells 14 themselves—i.e., without a data link to the at least one vehicle-side sensor 22—can recognize whether a danger situation is occurring, such as a crash, a skidding or a rollover of the motor vehicle 10. The microcontrollers 40 can open the switching elements 36 and bypass switching elements 38 in decentralized manner, based on danger signals provided by these internal cell sensors. The battery system (12) may also be designed redundant with respect to the handling and processing of the danger signals, so that danger signals provided at both the vehicle side and the cell side can be taken into account. For example, it is conceivable in such a redundant design that certain threshold values will be established, e.g., for accelerations. If the threshold values are crossed by the accelerations detected by the internal cell sensors, the switching elements 36 and bypass switching elements 38 will be opened directly. If the threshold values are not reached by the accelerations detected by the internal cell sensors, the system will wait for a signal input from the vehicle-side sensor 22 and only then will the opening of the switching elements 36 and bypass switching elements 38 occur. This can prevent a hasty and possibly needless opening of the switching elements 36 and bypass switching elements 38. On the other hand, if a collision of the motor vehicle 10 is very severe, so that the threshold values are crossed, the battery cells 14 can independently respond very quickly to this by an opening of switching elements 36 and bypass switching elements 38 even before the danger signal has arrived from the vehicle-side sensor 22.

The control device 16, i.e., the assemblage of the central control unit 42 and the microcontrollers 4, is designed to actuate the switching elements 36 to close the switching elements 36 after the opening of the switching elements 36 and the bypass switching elements 38 for the battery cells 14 functioning fault-free with the bypass switching elements 38 still opened. In other words, the galvanic cells 32 of the intact battery cells 14 thus continue to be interconnected in current conducting manner.

For the battery cells 14 not functioning fault-free, with switching elements 36 still opened, the bypass switching elements 38 are closed. In the case of a pure series circuit of the battery cells 14, it is ensured in this way that the defective battery cells 14 can be easily bypassed internally in the cell with respect to the galvanic cells 32, so that a current flow is made possible in a series circuit of defective and nondefective battery cells 14.

Of course, contrary to the representation shown, the battery cells 14 may also be assembled into individual cell blocks or modules, and within these modules the battery cells 14 may also be switched in parallel, for example. It need not be provided, for the parallel switched battery cells 14, that the parallel switched and no longer intact battery cells 14 be used likewise to carry current by closing the bypass switching elements 38—as long as at least one of the battery cells 14 is still intact and the switching element 36 has been closed accordingly after the crash.

Thus, with the described battery system 12, it is possible on the one hand to disconnect the individual galvanic cells 32 from each other in a reliable manner on the cell level in event of a crash or a collision of the motor vehicle 10. On the other hand, it is also possible to decide on the cell level which of the battery cells 14 in the battery system 12 are still intact and can continue to be used for the energy supply after a crash.

The invention claimed is:

1. A dynamically disconnectable battery system for a motor vehicle, comprising:
   a plurality of battery cells, having a respective battery cell housing with electrical connections by which the battery cells are electrically interconnected, wherein in the battery cell housings there is arranged a respective cell branch connecting the connections to a galvanic cell, wherein
   each cell branch has a switching element for opening and closing the cell branch; and
   the battery system has a control device in communication with at least one sensor, wherein the control device is programmed to actuate all the switching elements of the cell branches to open the switching elements when the control device receives a danger signal from the at least one sensor above a first threshold,
   wherein each battery cell includes at least one internal sensor integrated with a microcontroller in communication with the control device, each microcontroller programmed to actuate the switching element of its respective battery cell to open directly if the integrated microcontroller determines that the danger signal received from the at least one internal sensor is above a second threshold, wherein the second threshold is greater than the first threshold.

2. The dynamically disconnectable battery system as claimed in claim 1, further comprising a crash sensor wherein the control device is programmed to receive the danger signal from the crash sensor.

3. The dynamically disconnectable battery system as claimed in claim 1, wherein the sensors are shock sensors, gyrometers and/or acceleration sensors.

4. The dynamically disconnectable battery system as claimed in claim 1, wherein the battery system has at least one contactor for disconnecting a plus pole from a minus pole of the battery system, wherein the control device is programmed to actuate the contactor for opening the contactor if the control device has received the danger signal.

5. The dynamically disconnectable battery system as claimed in claim 4, wherein the control device is programmed to actuate the switching elements of the cell branches for opening the switching elements only if the contactor has been opened.

6. The dynamically disconnectable battery system as claimed in claim 1, wherein each battery cell housings has a respective bypass branch for bypassing the respective galvanic cell and each bypass branch has a bypass switching element for opening and closing the bypass branch, wherein the control device is programmed to actuate the switching elements and the bypass switching elements to open if the control device has received the danger signal above the first threshold.

7. The dynamically disconnectable battery system as claimed in claim 6, wherein the control device is programmed to actuate the switching elements to close the switching elements after the opening of the switching elements and bypass switching elements if the battery cells are functioning fault-free and the bypass switching elements are still opened.

8. The dynamically disconnectable battery system as claimed in claim 7, wherein the control device is programmed to actuate the bypass switching elements to close the bypass switching elements after the opening of the switching elements and bypass switching elements if the battery cells are not functioning fault-free and the switching elements are still opened.

9. The dynamically disconnectable battery system as claimed in claim 1, wherein the at least one internal sensor of each battery cell detects whether the battery cells are fault-free and transmits this data to the control device.

* * * * *